Nov. 7, 1967   T. G. HARRIS   3,351,510
METHOD OF MAKING SHEET MATERIAL
Filed July 7, 1964
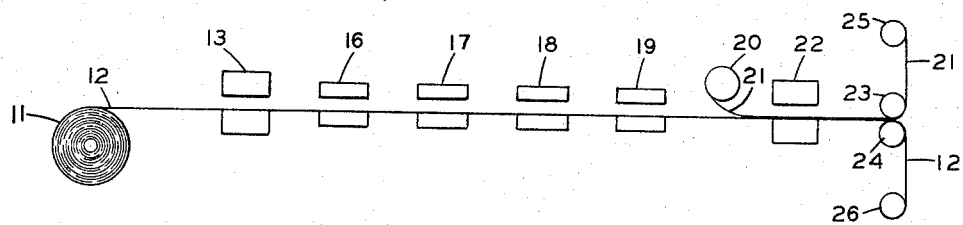
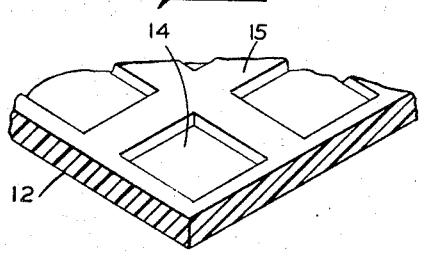
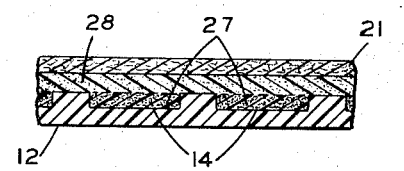
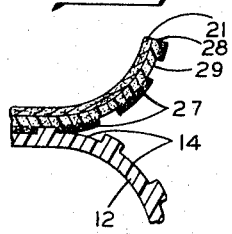
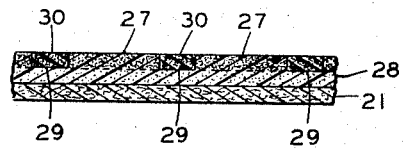
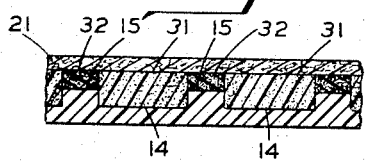
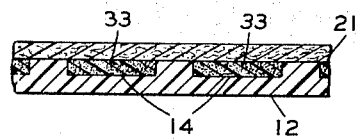
INVENTOR
THOMAS G. HARRIS
BY *Stephen S. Hunting*
ATTORNEY United States Patent Office 3,351,510
Patented Nov. 7, 1967

3,351,510
METHOD OF MAKING SHEET MATERIAL
Thomas G. Harris, East Hempfield Township, Lancaster County, Pa., assignor to Armstrong Cork Company, Lancaster, Pa., a corporation of Pennsylvania
Filed July 7, 1964, Ser. No. 380,904
2 Claims. (Cl. 156—232)

ABSTRACT OF THE DISCLOSURE

Method of making a sheet material having a design with an embossed effect. A carrier web is embossed to form a plurality of lands and depressions. One or more layers of fusible material is spread on the carrier material to cover at least the depressions and/or the lands. The fusible material may be of mixed colors or the layers may be of plural colors. A backing member is applied over the top of the fusible material and the composite structure is consolidated. The carrier is then stripped from the fusible material which is now bonded to and carried by the backing member. The embossed, consolidated fused material may now be left with its embossed configuration or filled in with another fusible material and consolidated to form a flat surface finish.

---

Many methods have been used to make sheet material having decorated surfaces. Such sheet material is used in many applications and industries. One example of an application which utilizes decorative sheet material may be found in the floor and wall covering field. In this field the demand of the market has called for a wide variety of designs in such sheet material.

A large market has been found for decorative sheet material which is relieved or embossed. The usual method of embossing such sheet material is by mechanical means such as a rotary cylinder or a reciprocating press. In either case, the embossing is usually performed after the design or pattern is placed upon the material. Such a procedure necessarily results in registration problems between the embossing mechanism and the design which has been previously placed upon the sheet material. Further, the extent to which any given material may be embossed depends upon the thickness and resiliency of the material. As a result, the amount of relief produced by the embossing of finished floor and wall covering material is usually small, as such material is relatively thick and resilient. Also, some sheet material will not retain an embossed design of great height when applied by mechanical means such as a rotary cylinder or reciprocating press, as such material has an "elastic memory."

The method of the present invention provides decorative sheet material which will retain an embossed effect of a width, height, and clarity greater than that known heretofore without the attendant difficulties attributed to the resilience of said material.

An object of the present invention is to provide a method of making sheet material having a design with an embossed effect.

Another object of the present invention is to provide a method of making sheet material having a design with an embossed effect wherein the width, height, and clarity of the embossed effect may be much greater than that heretofore known.

Another object of the present invention is to provide a method of making sheet material having a design with an embossed effect wherein the width, height, and clarity of the embossed effect is not materially affected by the resilience, thickness, or compressibility of the finished sheet material.

Other objects of the present invention will be readily apparent from the detailed description thereof with reference to the drawings wherein FIGURE 1 is a schematic view in elevation of a manufacturing operation embodying the steps of a method according to the invention;

FIGURE 2 is a view in perspective of an embossed carrier;

FIGURE 3 is a sectional view in elevation of an embossed carrier which has been covered with fusible material during one series of operations;

FIGURE 4 is a sectional view in elevation of the material shown in FIGURE 3 wherein a portion of the carrier has been separated from a portion of the fusible material which has been fused to backing material;

FIGURE 5 shows a sectional view in elevation of the composite sheet of fused and backing material shown in FIGURE 4 wherein the areas between the depressions of the fused material have been filled with fusible material.

FIGURE 6 is a sectional view in elevation of an embossed carrier which has been covered with fusible material during another series of operations; and FIGURE 7 is a sectional view in elevation of an embossed carrier whose depressed areas have been filled with fusible material.

Referring now to FIGURE 1, there is shown a roll 11 of embossable carrier material 12 in sheet form. Carrier 12 may be of any suitable material which may be readily embossed and which will retain an embossed impression. Many types of such material are known including those of the thermoplastic and thermosetting types. Carrier 12 passes under embossing mechanism 13 wherein a desired impression may be embossed in said carrier 12. The embossing mechanism 13 may be of the reciprocating or rotary type. As shown in FIGURE 1, the embossing mechanism 13 is of a reciprocating type which necessarily requires intermittent movement of the carrier 12 therethrough.

FIGURE 2 shows an example of a carrier 12 which has been embossed to provide a design or pattern including a plurality of depressions 14 and lands 15. It is to be understood that any desired pattern or design may be embossed on carrier 12.

After being embossed, carrier 12 is intermittently and successively passed through stencils 16 to 19. Stencils 16 to 19 deposit various types, colors, and shapes of fusible material on the upper surface of carrier 12. Usually, the shapes of the perforations of stencils 16 to 19 correspond to the shapes which have been embossed in carrier 12. Also, the stencils 16 to 19 usually are in register with the design which has been impressed or embossed on carrier 12. Although only four stencils have been shown, more or less may be used, depending upon the design which is to be placed on the final product. As is apparent from FIGURE 1, the stencils 16 to 19 necessitate an intermittent movement of carrier 12. However, it is to be understood that continuous movement of carrier 12 is possible if rotary or other continuous types of embossing and design creating mechanisms are used.

Subsequent to the stenciling operation, carrier 12 passes below backing material supply roller 20, from which a sheet of backing material 21 extends to cover the now-stenciled carrier 12. Stenciled carrier 12 and overlying backing sheet 21 next pass into consolidating mechanism 22 wherein the fusible material on carrier 12 is fused and secured to backing sheet 21 under elevated temperature and pressure. The various materials, pressures, and temperatures may be so chosen according to known principles of adhesion that there will be little, if any, bonding action between the fused material and the carrier. The backing sheet 21, fused material, and carrier 12 then passes between and around separation rollers 23 and 24 at which point backing sheet 21 with the fused material secured thereto will be separated from carrier 12. Backing sheet 21 and the fused material attached thereto may be collected upon roll 25, while carrier 12 may be collected upon roll 26. It is noted that the fused material which is secured to backing sheet 21 will retain the impressions which have been transferred to it by the embossed design in carrier 12. Carrier 12 may be reused as is or may be heated to remove the embossed design, re-embossed, and reused. If desired, carrier 12 may be discarded after a single run.

FIGURE 3 shows an example of how the fusible material may be applied to embossed carrier 12. In this case, depressions 14 have been filled with fusible material 27 to a point which is approximately level with the upper surface of carrier 12. A layer of fusible material 28 is then placed over the entire carrier 12. The fusible material in each of the depressions 14 may be of the same or different color schemes. Similarly, the fusible material in layer 28 may be of the same or different color scheme as any one or all of the depressions 14. As explained above, a backing sheet 21 may then be applied in overlying relationship to layer 28. Subsequently, the consolidation and separation processes described above may be performed.

Referring now to FIGURE 4, there is shown the carrier 12 being separated from the composite sheet formed by the fused materials 27 and 28 which have been secured to backing 21. This separation is a relatively simple operation and is accomplished by means of known principles of adhesion whereby the materials are chosen so that the fusible material will be readily secured or attached to carrier 21 but will not be secured or attached in an appreciable manner to backing 12. After carrier 12 is removed from the fused material 27 and 28, the spaces in said fused material 27 and 28 which were formerly occupied by the lands 15 of carrier 12 will remain as depressions 29 in said fused material 27 and 28 and will provide an embossed effect of great width, depth, and clarity therein.

FIGURE 5 shows a backing 21 and associated fused material 27 and 28 after being stripped from carrier 12 wherein depressions 29 imposed by lands 15 of carrier 12 are filled with fusible material 30. This composite sheet may then be again consolidated to fuse and secure fusible material 30 to fused material 27 and 28. In this manner, additional patterns and color schemes may be afforded.

FIGURE 6 shows another example of how fusible material may be applied to carrier 12. In this case, piles 31 of fusible material may be placed in depressions 14. Piles 31 extend above the upper surface of carrier 12. Piles 32 of fusible material may then be placed on lands 15 and may have an upper surface which lies substantially in the same plane as the upper surface of piles 31. As in the example described above, a backing sheet 21 may then be placed upon the upper surfaces of piles 31 and 32. Subsequently, the consolidation and separation steps may be performed.

Referring now to FIGURE 7, there is shown another example of how fusible material may be applied to carrier 12. In this case, fusible material 33 may be placed in depressions 14 of carrier 12. The color scheme of the fusible material in each depression may be the same or different from that of any other. In any event, a backing sheet 21 may then be placed over carrier 12. Thereafter, the consolidation and separation steps may be performed.

An example of composite sheet material which may be formed by using the method according to the invention is as follows. The carrier may be a sheet of polypropylene of approximately .060" in thickness. The embossing temperature may be about 320–340° F., and the embossing pressure may be approximately 1500 p.s.i. The duration of the embossing step may be approximately one minute. The fusible material may consist of a granular, vinyl mix. The backing 21 may be of felt or rubber latex impregnated, asbestos sheet material. The consolidating temperature may be approximately 310° F., and the consolidating pressure may be on the order of 1500 p.s.i. The duration of the consolidation step may be approximately one minute.

It is to be understood that the invention is not limited to the specific materials or numerical limitations set forth herein. For example, the carrier 12 may be of polypropylene, "Mylar," nylon, coated paper, etc. The mix may be granular linoleum or a combination of granular linoleum and granular vinyl. The fusible material may be of a single color or may be multi-colored. The fusible material may include some glitter material. It will be apparent that many different types of color schemes may be used. Other materials may be used for the backing, fusible material and the carrier. The shape or shapes of the depressions 14 and lands 15 may be varied to produce different designs and embossed effects in the fused material which is adhered to the backing. It is also noted that the stencils may or may not be registered with the depressions in the carrier. The shape of the stencil openings and the depressions and/or lands need not be the same. The entire operation may be continuous by using contiuous embossing, stenciling, and consolidating apparatus. Such apparatus is usually found in the form of rotary-type equipment. It should be noted that the method of the present invention is not limited to a stencil application of fusible material, and any suitable means of depositing fusible material on the carrier may be used.

It is apparent that the method according to the present invention provides an economical, efficient method of making sheet material having a design with an embossed effect wherein the height, width, and clarity of said embossed effect is greater than that heretofore known. The product produced by the method of the present invention has an embossability which is limited only by that of the carrier rather than that of the final product itself. Since the carrier material may be chosen from those materials which are relatively thin and more readily embossable as compared to finished floor or wall coverings, for example, improved embossed effects in such coverings may be obtained. However, the improved embossed effects obtainable with the method according to the present invention are not limited to the field of floor and wall coverings but may be applied to various other types of sheet materials and products.

Various modifications may occur to those skilled in the art without departing from the spirit and scope of the invention as defined in the claims.

I claim:

1. A method of making sheet material having a design with an embossed effect comprising the steps of embossing carrier sheet with a given design to form a plurality of depressions and lands therein, filling said depressions with granular fusible material, placing backing material over said embossed carrier sheet and over said fusible material, consolidating said fusible material on said backing material whereby said fusible material will be fused and attached to said backing material, separating said embossed carrier from said fused material and said backing material whereby the removal of said lands from said fused material will create embossed areas therein, filling these embossed areas with fusible material, and then consolidating the sheet material again to fuse the last-mentioned fusible material to the originally consolidate fusible material to form a flat surface sheet.

2. A method of making sheet material having a design with an embossed effect comprising the steps of embossing a carrier sheet with a given design to form a plurality of depressions and lands therein, filling said depressions with granular fusible material to a level above the plane of the lands, placing a granular fusible material over the lands to a level equal to the level of the first-applied fusible material, placing backing material over said embossed carrier sheet and over said fusible materials, consolidating said fusible materials on said backing sheet whereby said fusible materials will be fused and attached to said backing material, and separating said embossed carrier from said fused materials and said backing material whereby the removal of said lands from said fused materials will create an embossed effect therein.

References Cited

UNITED STATES PATENTS

| | | | |
|---|---|---|---|
| 2,303,395 | 12/1942 | Schultz et al. | 264—246 |
| 2,470,493 | 5/1949 | Karfiol et al. | 156—232 |
| 2,556,504 | 6/1951 | Prestwich | 156—232 |
| 2,817,619 | 12/1957 | Bickel et al. | 156—232 |
| 3,012,285 | 12/1961 | Marcus et al. | 264—246 X |
| 3,052,581 | 9/1962 | Gutknecht | 156—10 |
| 3,056,224 | 10/1962 | Almy et al. | 161—5 |
| 3,061,500 | 10/1962 | Krier | 156—245 |
| 3,083,133 | 3/1963 | Hansen et al. | 156—246 |
| 3,150,216 | 9/1964 | Salcer | 264—161 |

EARL M. BERGERT, *Primary Examiner.*

M. L. KATZ, *Assistant Examiner.*